C. M. HEETER.
JOINT FOR WELL TOOLS, &c.
APPLICATION FILED SEPT. 24, 1909.
959,341.
Patented May 24, 1910.
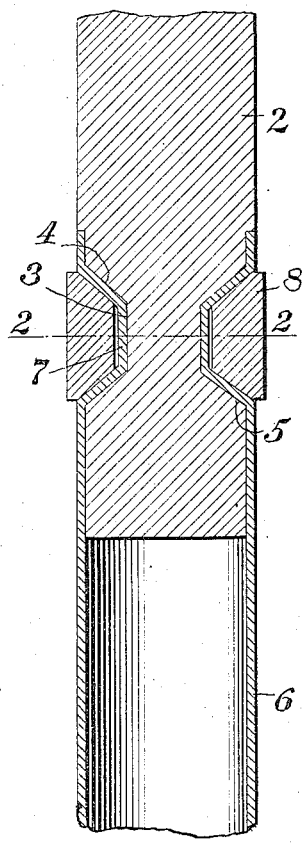
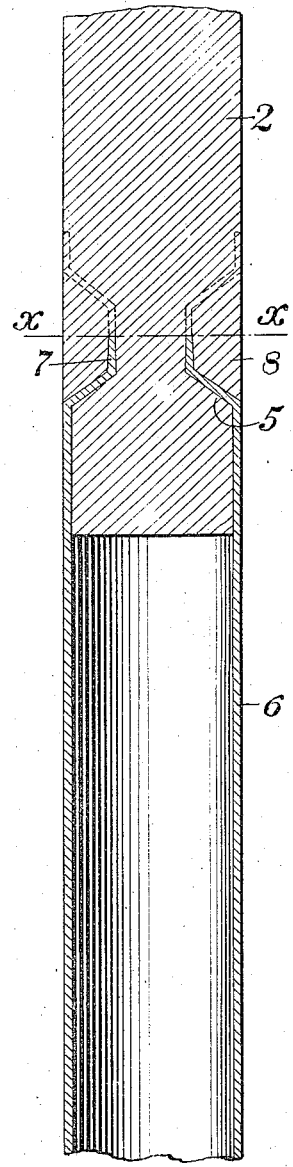
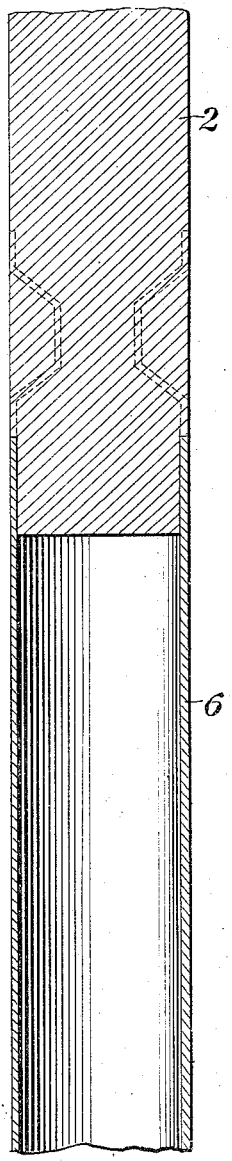
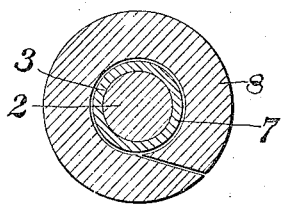
WITNESSES,
F. E. Gaither.
Ella McConnell
INVENTOR.
C. M. Heeter,

UNITED STATES PATENT OFFICE.

CHARLES M. HEETER, OF BUTLER, PENNSYLVANIA.

JOINT FOR WELL-TOOLS, &c.

959,341. Specification of Letters Patent. Patented May 24, 1910.

Application filed September 24, 1909. Serial No. 519,331.

*To all whom it may concern:*

Be it known that I, CHARLES M. HEETER, a resident of Butler, in the county of Butler and State of Pennsylvania, have invented certain new and useful Improvements in Joints for Well-Tools, &c., of which the following is a specification.

This invention relates to a joint between two metal parts, one tubular or hollow and fitting over the other and interlocked therewith before the parts are welded together. In the preferred practice, the inner or "stem" member is formed with a depression, and the tubular or "socket" member slipped thereover and indented or contracted into the depression, and then a surrounding member or collar is fitted within the socket depression. The parts thus assembled are welded together. The area of the weld may vary. It may include either part or all of the interlocking joint, and in the manufacture of well tools I prefer to have it extend over only a part or the upper end of the joint, leaving the lower portion interlocked but not merged together in the manner accomplished by welding. The welding operation tends to thin the socket member and diminishes its strain-resisting strength, particularly strains exerted longitudinally of the tool. By welding only a portion of the interlock, I secure a substantially integral joint which in strength much more than compensates for the thinning of the metal. Below the weld the thickness of the socket is not affected, and its embracing union with the recessed stem is not impaired. Thus, the advantage of a mechanical union due to a joint of this character is secured, while by welding a portion of the connection the parts are securely held against stripping or separating.

While the invention is designed primarily for use in the manufacture of well tools of various kinds, its use is not thus restricted, and it may be availed of wherever it may be advantageously applied, and the description and claims will be interpreted with this understanding.

In the accompanying drawings, Figure 1 is a longitudinal section, showing the parts of the joint assembled and before being welded, and Fig. 2 is a cross-section on line 2—2 of Fig. 1. Fig. 3 is a longitudinal section, showing a portion of the joint welded; and Fig. 4 is a similar section showing the whole joint welded.

In practicing the invention in the construction of well tools, the uppermost or stem member 2 is provided with an encircling depression 3 which is preferably so formed as to provide the oppositely sloping upper and lower shoulders 4 and 5, respectively. 6 is the tubular or socket member joined to stem 2, the same being of sufficient diameter to pass over the stem, and is extended a suitable distance inward or upward from depression 3. The tubular member is then indented or contracted by any suitable means into the depression 3, as indicated at 7, thus forming an interlocking joint. A blank or piece of metal to form a ring, collar, or other suitable embracing body 8 is then closed around and within the socket contraction, as shown in Fig. 2. The parts thus assembled are then heated and welded together. In applying the invention to well tools, the preferred practice is to extend the weld from the upper end of the joint downwardly only part way, say to line X—X of Fig. 3, leaving the lower portion unwelded. However, the weld may include the whole of the interlocking joint, as in Fig. 4.

With only the upper portion welded, as in Fig. 3, the lower portion overhanging shoulder 5 retains its original thickness, and its embracing union with the lower portion of the stem depression is not impaired. Thus, the relatively thin metal of the tube or socket is, for a portion of its length, made integral with the stem which carries it, while at the unwelded portion of the joint the tubular part retains its original strong embrace of the recessed stem, and its strength is such as to resist fracturing or stripping under the heavy strains to which tools of the character shown are subjected. A joint thus formed combines the advantages of a welded and also a merely interlocked connection, stripping of one part from the other is precluded, and the strength of the tubular part is not impaired by the thinning incident to welding a portion of it to the stem. It will be understood, however, that the advantages of the invention are not necessarily confined to the adaptation which involves welding only a portion of the joint. An exceedingly strong, durable, and altogether efficient joint is had by interlocking the parts as described and welding together the whole of the interlocked portions.

I claim:—

1. The method of uniting the stem and socket of a well tool or equivalent structure, consisting in forming the stem with a depression, entering the stem in the socket portion and contracting the latter into the depression to form an interlock, and welding the socket portion to the stem portion.

2. The method of uniting the stem and socket of a well tool or equivalent structure, consisting in forming the stem with an encircling depression, entering the stem within the socket and forming the latter with an encircling depression which is entered in the stem depression and forms an interlock, and welding the socket to the stem.

3. The method of uniting the stem and socket of a well tool or equivalent structure, consisting in forming the stem with an encircling depression, entering the stem in the socket and contracting the latter into the depression, encircling the depressed portion of the socket with a collar, and welding together the collar socket and stem.

4. The method of uniting the stem and socket of a well tool or equivalent structure, consisting in forming the stem with a depression, passing the socket over the stem and contracting the same into the depression, and welding together the stem and socket for a portion of the length of their depressions.

5. The method of uniting the stem and socket of a well tool or equivalent structure, consisting in forming the stem with a depression, passing the socket over the stem and contracting the same into the depression, and welding together the overlapping parts from an extremity of the socket to a line intersecting the stem depression.

6. The method of uniting the stem and socket of a well tool or like device, consisting in forming a stem with an encircling depression, passing the stem into a socket and contracting the latter into the depression, encircling the depressed portion of the socket with a collar, and welding together portions of the collar socket and stem.

7. The method of uniting the stem and socket of a well tool or like device, consisting in forming a stem with an encircling depression, passing the stem into the socket and indenting the latter into the socket depression, encircling the socket indentation with a collar, heating the parts thus assembled and welding said heated parts.

In testimony whereof I affix my signature in presence of two witnesses.

CHARLES M. HEETER.

Witnesses:
T. C. CAMPBELL,
JAMES O. CAMPBELL.